April 11, 1933.    F. C. PALMER    1,903,723
MECHANICAL FRICTION BRAKE ENSEMBLE
Filed Sept. 22, 1932    3 Sheets-Sheet 1
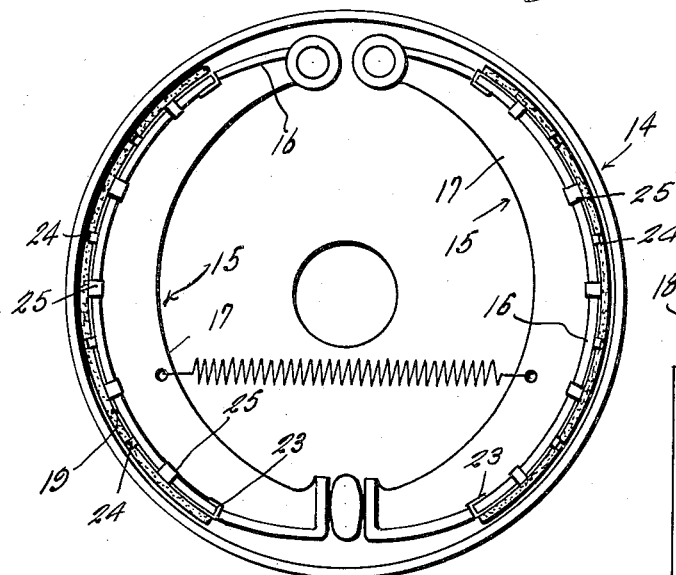
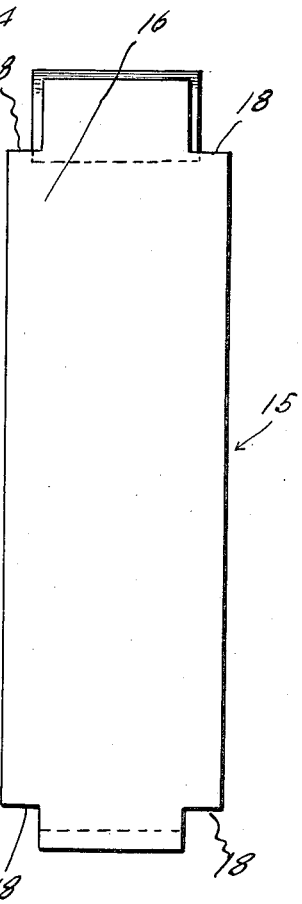
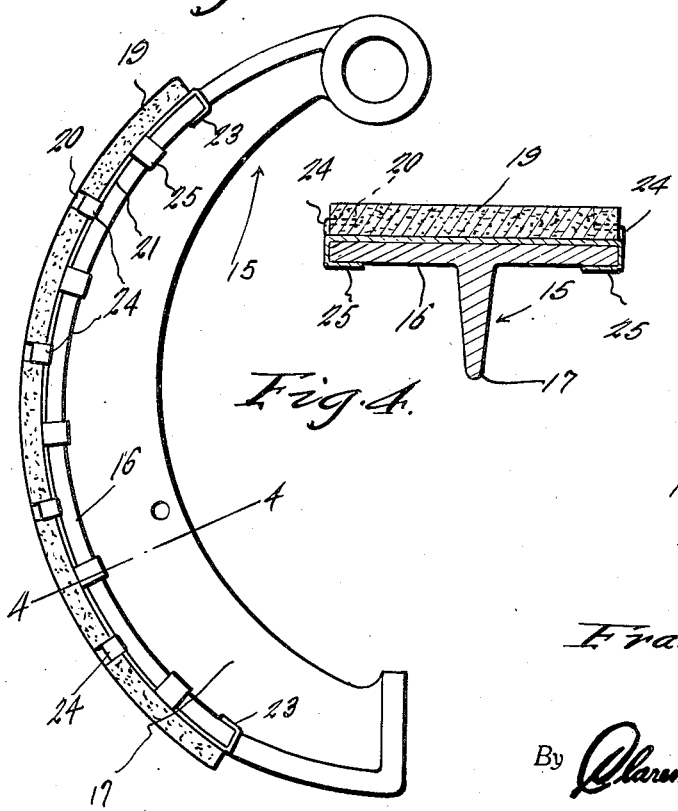
Inventor
Frank C. Palmer
By Clarence A. O'Brien
Attorney April 11, 1933.     F. C. PALMER     1,903,723
MECHANICAL FRICTION BRAKE ENSEMBLE
Filed Sept. 22, 1932     3 Sheets-Sheet 2
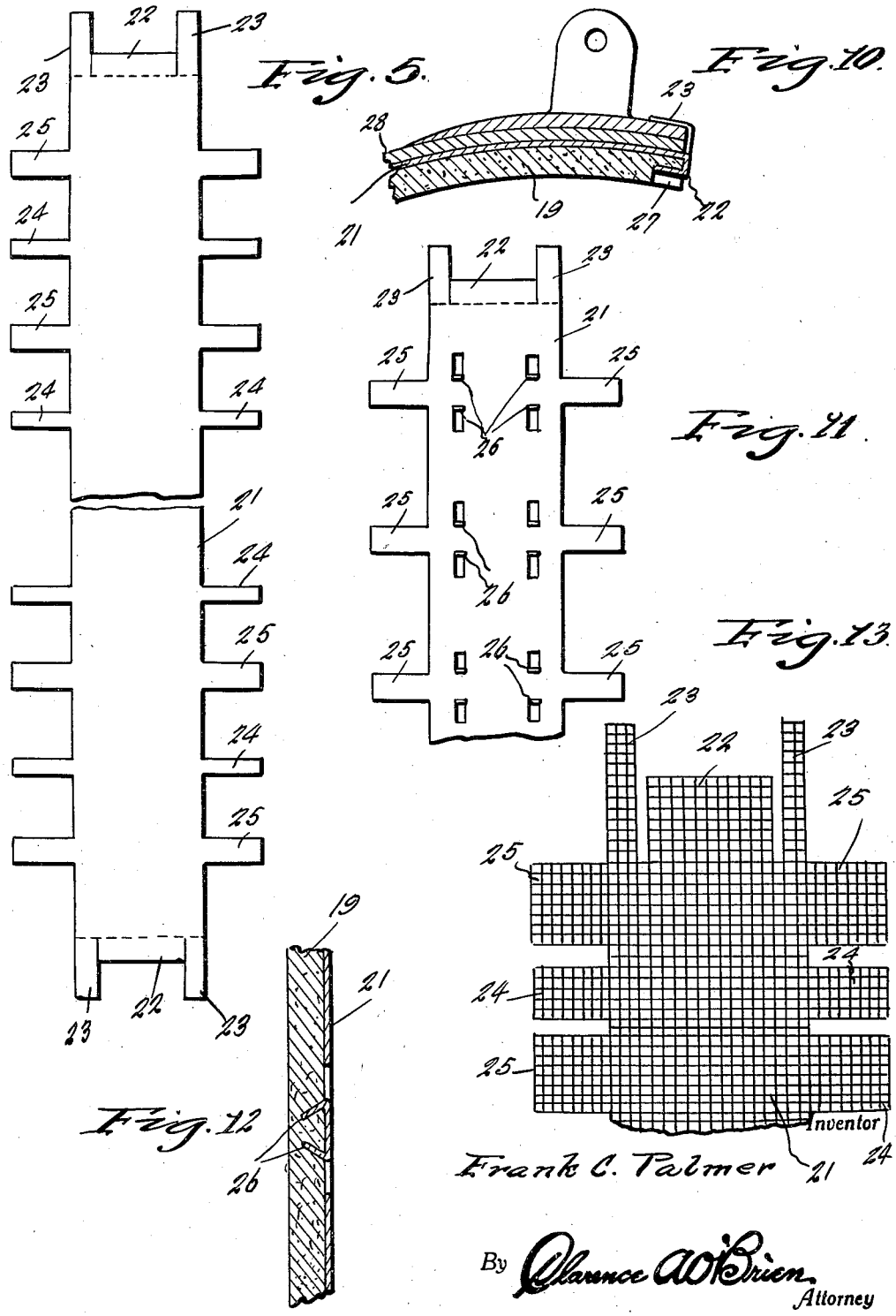

April 11, 1933.  F. C. PALMER  1,903,723
MECHANICAL FRICTION BRAKE ENSEMBLE
Filed Sept. 22, 1932  3 Sheets-Sheet 3
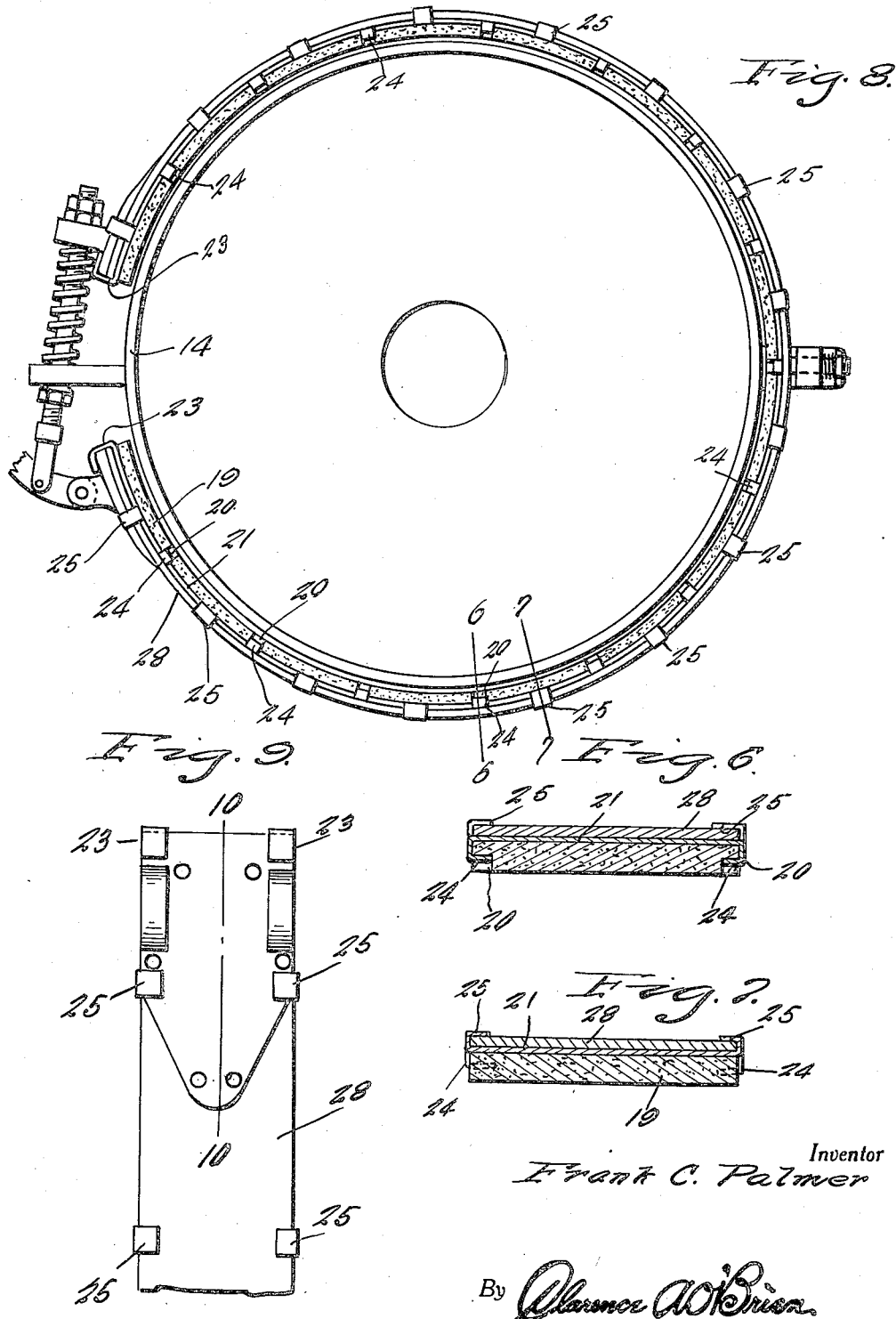
Inventor
Frank C. Palmer
By Clarence A. O'Brien
Attorney Patented Apr. 11, 1933

1,903,723

UNITED STATES PATENT OFFICE

FRANK C. PALMER, OF WEST PALM BEACH, FLORIDA

MECHANICAL FRICTION BRAKE ENSEMBLE

Application filed September 22, 1932. Serial No. 634,398.

This invention relates to certain structural improvements and refinements embodied in a novel assembly of parts defining a distinctive friction brake construction.

Described in greater detail, it will be observed by way of reference to the illustrative drawings that the inventive conception comprehends an arrangement which is especially practical for incorporation in motor vehicle brake equipment but which is equally well-adapted to brake constructions used on cranes, hoisting engines, and machinery of all kinds where removable brake bands and replaceable linings are employed.

I am well aware of the fact that the structural features constituting the essential novelty of the invention are not broadly new and that the art to which the invention relates is rather well developed. My principal aim is to generally improve upon patented and marketed brake arrangements by providing an efficient and economical co-ordination of mechanical details operable in conjunction with either external or internal brake assemblies.

The specific points of structural differentiation and novelty will become more readily apparent from the following description and drawings.

In the accompanying illustrative drawings wherein like numerals are employed to designate like parts throughout the same:

Figure 1 is a side elevational view showing an ensemble including a brake drum, a pair of companion swingable brake shoes for internal brakes, together with the improved brake lining units removably applicable to said shoes.

Figure 2 is an enlarged detail view of one of the shoes and the accompanying friction lining unit.

Figure 3 is a detail plan view of one of the brake shoes with the lining unit removed.

Figure 4 is an enlarged transverse section taken on the plane of the line 4—4 of Figure 2.

Figure 5 is a top plan view of one style or form of backing and fastening strip for the brake lining.

Figures 6 and 7 are transverse or cross sectional views taken on the planes of the line 6—6 and 7—7 respectively of Figure 8.

Figure 8 is a view similar to Figure 1, showing the invention as applied to an external contracting type brake assembly.

Figure 9 is a fragmentary view of one end portion of the brake band.

Figure 10 is a section on the line 10—10 of Figure 9.

Figure 11 is a view similar to Figure 5 showing a modified type backing strip.

Figure 12 is a detail sectional view showing the manner in which the backing shown in Figure 11 is co-operable with the frictional brake lining.

Figure 13 is a view of a still further pattern or design of backing of a wire mesh or fabricated type usable in connection with molded linings.

Attention is first invited to Figure 1, wherein it will be observed that the numeral 14 designates a conventional brake drum while the numerals 15 designate a pair of complemental brake shoes pivotally connected thereto. For sake of distinction, the brake shoe as shown in Figures 2 and 4 comprises a rim or flange 16 and reinforcing rib 17. Also as shown in Figure 3, the end portions are formed into retention shoulders 18.

The brake lining, which may be of any appropriate texture and material is distinguished by the numeral 19 and in accordance with the principles of the invention herein illustrated, it is provided along opposite longitudinal edges and in its friction side with depressions or recesses which may be distinguished as keeper notches 20. The lining 19 is co-operable with the backing strip or plate 21 (see Figure 5) in forming a single unit applicable to the brake shoe.

At its opposite ends the backing is provided with bendable abutments or lips 22 to engage the adjacent end of the lining and further formed with bendable tongues 23 to engage over the shoulders 18. Along its longitudinal edges the backing strip is provided with alternate extensions 24 and 25 which define retaining ears. The ears 24 are co-operable with the keeper notches 20 in the lining by being bent into said notches, while the ears 25 are clenched or bent over the longitudinal edge portions of the flange 16 of the brake shoe.

The same principle of construction is carried forward in the form of backing strip illustrated in Figure 11. Therefore, corresponding parts are designated by like numerals. In this arrangement however the so-called ears 24 may be dispensed with, if desired, and the connection of the backing to the lining may be made in a slightly different manner by simply striking out pairs of closely related prongs 26, said prongs being imbedded in the fabric lining 19 as shown in Figure 12.

Referring to Figure 10, it will be observed that the end portions of the lining may, if desired, be formed with additional recesses or seats 27, into which the abutment lips 22 may be bent for security of maintenance.

The principle of construction illustrated in Figure 13 is the same as that shown in Figure 5, except the backing may be of openwork construction, that is, of a wire mesh type.

Some of the outstanding features of the improved structure are as follows:

1. Applicable to either an external brake band or an internal brake band.
2. Simplicity of fabrication.
3. The method of providing a positive stop against any longitudinal movement of the brake lining on the brake lining back by turning over and clinching into the brake lining a part of the ends of the brake lining back.
4. The method of providing a positive stop against any longitudinal movement of the brake lining back on the brake band or brake shoe by turning over and securely fastening a part of the ends of the brake lining back on the brake band or brake shoe.
5. Consists of only two parts, a brake lining and brake lining back.
6. Economical application.
7. Simplicity of application.
8. More practical.
9. Economical to manufacture.
10. More efficient because of its stability.

The foregoing statements are made by way of comparison of the invention of this application with known marketed and prior patented arrangements of a generally similar character.

It is probably unnecessary to go into detail relative to the external type of brake illustrated in Figure 8 other than to say that in this arrangement instead of using brake shoes, the brake lining and backing is secured to a one-piece brake band 28.

The principal feature of the invention is obviously the provision of a friction brake lining unit including the lining per se in conjunction with the flexible backing wherein the backing is securely fastened to the lining to prevent either lateral or longitudinal shifting of these parts with respect to each other and wherein the backing is formed with end and side members to be securely clenched over complemental portions of the brake band or brake shoe as the case may be.

It is thought from the foregoing description that the advantages and novel features of the invention will be readily apparent.

It is to be understood that changes may be made in the construction and in the combination and arrangement of the several parts provided that such changes fall within the scope of the appended claims.

I claim:

1. As a new article of manufacture, a brake unit of the class described comprising a lining formed along opposite longitudinal edges with keeper notches and formed at opposite ends with retention seats, and a backing element of measurement commensurate with the lining, said backing being provided along opposite longitudinal edges with bendable ears bent into said keeper notches, and alternate bendable ears adapted to be bent in opposite directions to be secured to a brake band or shoe, said backing being formed at opposite ends with abutment lips adapted to be bent against the end portions of the lining and into said seats and further formed at said opposite ends with elongated tongues adapted to be bent over the adjacent end portions of the shoe or band.

2. As a new article of manufacture, a reinforcing and backing strip for use in conjunction with a brake lining, said strip being formed at opposite ends with pairs of outstanding elongated retaining tongues, and intervening bendable retaining lips, the opposite longitudinal edge portions of said strip being formed with alternately arranged laterally projecting bendable ears for connection with the lining and brake band respectively.

3. As a new article of manufacture, a backing strip for use in conjunction with a lining comprising a body formed at opposite ends with longitudinally extending and elongated retaining tongues and intervening bendable retaining lips, and formed along opposite longitudinal edges with transversely projecting bendable retaining ears, the intermediate portion of said body having a plurality of pairs of prongs struck out therefrom and adapted to be imbedded in adjacent portions of the lining.

4. In a structure of the class described, in combination, a brake shoe comprising a flange having a reinforcing rib, the opposite end portions of said flange being constructed to define shoulders, a complemental lining formed at opposite ends with retaining seats and along opposite longitudinal edges with keeper notches, an intervening backing strip interposed between the flange and lining and formed at opposite ends with tongues bent over and engaging said shoul-